(12) United States Patent
Perkinson et al.

(10) Patent No.: US 8,167,501 B2
(45) Date of Patent: May 1, 2012

(54) SEPARATOR FOR BEARING ASSEMBLIES WITH CYCLIC LOADS

(75) Inventors: Robert H. Perkinson, Somers, CT (US); Matthew C. Soule, Grandby, CT (US); Herbert J. Holl, Feeding Hills, MA (US)

(73) Assignee: Hamilton Sundstrand Corporation, Rockford, IL (US)

(*) Notice: Subject to any disclaimer, the term of this patent is extended or adjusted under 35 U.S.C. 154(b) by 439 days.

(21) Appl. No.: 12/322,408

(22) Filed: Feb. 2, 2009

(65) Prior Publication Data
US 2010/0195948 A1    Aug. 5, 2010

(51) Int. Cl.
F16C 19/20    (2006.01)

(52) U.S. Cl. ........................................ 384/521

(58) Field of Classification Search .................. 384/51, 384/520, 521, 490, 523
See application file for complete search history.

(56) References Cited

U.S. PATENT DOCUMENTS

| | | | | |
|---|---|---|---|---|
| 975,616 A | * | 11/1910 | Hess | 384/521 |
| 1,375,313 A | * | 4/1921 | Ohlsson | 384/521 |
| 1,405,894 A | * | 2/1922 | Borg | 384/520 |
| 2,566,421 A | | 9/1951 | Lapointe | |
| 2,893,792 A | * | 7/1959 | Wikoff et al. | 384/520 |
| 2,897,021 A | * | 7/1959 | Zeilman | 384/520 |
| 3,455,616 A | * | 7/1969 | George et al. | 384/520 |
| 4,042,248 A | * | 8/1977 | Williamitis | 384/387 |
| 4,133,588 A | | 1/1979 | Earsley | |
| 4,692,097 A | | 9/1987 | Bibollet | |
| 4,838,712 A | | 6/1989 | Kubo et al. | |
| 5,356,227 A | * | 10/1994 | Sibley et al. | 384/463 |
| 5,836,743 A | | 11/1998 | Carvalho et al. | |
| 6,347,558 B1 | * | 2/2002 | Miyaguchi et al. | 384/43 |
| 6,643,932 B2 | | 11/2003 | Takagi et al. | |
| 2005/0175264 A1 | | 8/2005 | Kim et al. | |
| 2007/0211979 A1 | | 9/2007 | Habibvand | |

FOREIGN PATENT DOCUMENTS

| | | | | |
|---|---|---|---|---|
| JP | 2-146311 | * | 6/1990 | 384/521 |
| WO | WO2007/136367 A1 | | 11/2007 | |

* cited by examiner

*Primary Examiner* — Michael P Ferguson
(74) *Attorney, Agent, or Firm* — Kinney & Lange, P.A.

(57) ABSTRACT

A bearing assembly includes first and second races, a plurality of ball bearings positioned between the first and second races, and a spacer positioned between each of the ball bearings. The spacers each include a body defining opposite first and second sides, a first substantially concave pocket located at the first side of the body, and a second substantially concave pocket located at the second side of the body. The first and second substantially concave pockets each define a central region having a first radius of curvature about a first center point and an outer region adjacent to the central region that has a second radius of curvature about a second center point. The first and second center points are spaced from one another, and the body includes a portion extending in between at least the respective central regions of the first and second substantially concave pockets.

13 Claims, 5 Drawing Sheets

SEPARATOR FOR BEARING ASSEMBLIES WITH CYCLIC LOADS

BACKGROUND

The present invention relates to bearing assemblies, and more particularly to spacers or separators for use with bearing assemblies.

Bearing assemblies with ball bearings are used in a variety of contexts. For example, ball bearing assemblies are used to support variable pitch blades of bladed, rotatable, fluid-moving machinery, such as variable pitch propellers. In that context, the ball bearing assembly permits blade angle change or pitch change while supporting and transmitting centrifugal and thrust loads created by the blade in the process of moving fluid. However, it has been found that high bearing operating friction typically resulting in assembly lifespan being less than optimal occurs under certain conditions.

It is desired to provide means for reducing failure and prolonging a useful life of ball bearing assemblies.

SUMMARY

A bearing assembly according to the present invention includes first and second races, a plurality of ball bearings positioned between the first and second races, and a spacer positioned between each of the ball bearings. The spacers each include a body defining opposite first and second sides, a first substantially concave pocket located at the first side of the body, and a second substantially concave pocket located at the second side of the body. The first and second substantially concave pockets each define a central region having a first radius of curvature about a first center point and an outer region adjacent to the central region that has a second radius of curvature about a second center point. The first and second center points are spaced from one another, and the body includes a portion extending in between at least the respective central regions of the first and second substantially concave pockets.

DETAILED DESCRIPTION

Figure 1:
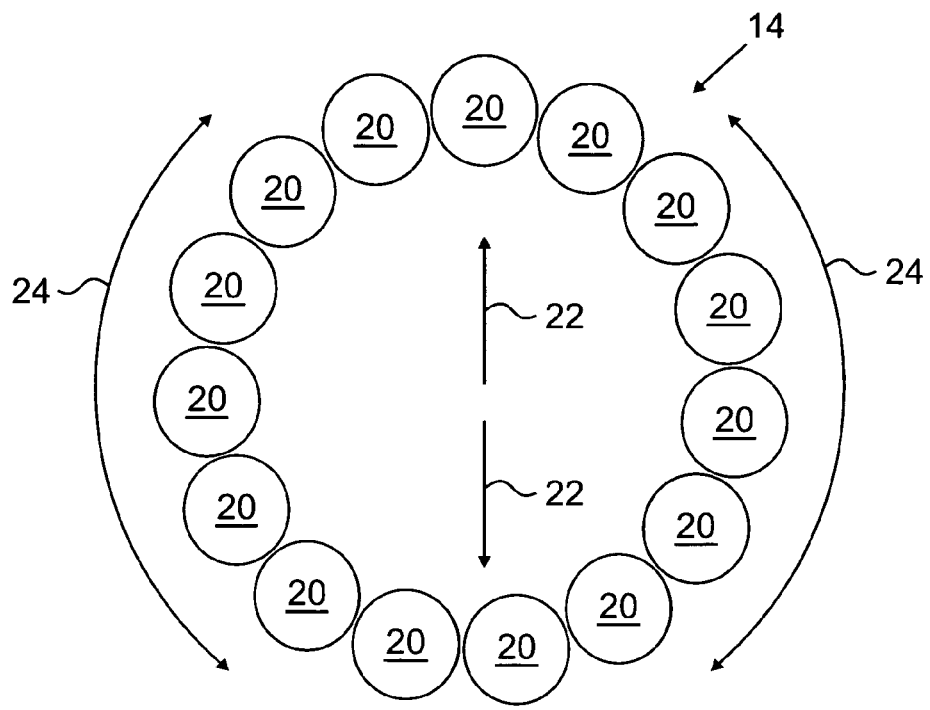
FIG. 1 is a schematic plan view of a prior art bearing assembly, illustrating cyclic loads.

In general, the present invention relates to spacers or separators for use with ball bearing assemblies to reduce detrimental effects of ball (i.e., ball bearing) bunching due to cyclic loading. It has been discovered that cyclic bearing loading is particularly problematic for certain applications. Cyclic loads tend to cause migration of the balls to a common point, which produces a "bunching" effect. Ball bunching effects cause a significant and undesirable increase in friction as adjacent balls rub against each other. Such increased friction can significantly reduce performance or even prevent operation. Considerable damage and wear (e.g., spalling and galling) to balls and raceways may also occur due to bunching effects, thus limiting the useful life of the bearing assembly. Undesirable costs and down-time associated with bearing assembly repair or replacement can be significant. The spacer (or separator) of the present invention can be made of a low-friction material, and is positioned between adjacent balls of the bearing assembly to prevent ball-to-ball contact, thereby mitigating adverse bunching effects. In one embodiment, the spacer can include a generally cylindrical body with substantially concave pockets located at opposite sides of the body for accepting a portion of a ball bearing. Each pocket can define a central concave region having a first radius about a first center point and an outer region adjacent to the central region that has a second radius about a second center point that is spaced or offset from the first center point. The body can further include a continuous middle portion extending between the substantially concave pockets.

Investigation of prior art bearing systems has revealed that bearing assemblies used in certain applications are exposed to cyclic loading that may not be present with other types of applications. For example, ball bearing assemblies are used to support variable pitch blades of bladed, rotatable, fluid-moving machinery, such as with variable pitch propellers. One example of such a known variable pitch blade application is disclosed in PCT Published App. No. WO2007136367, entitled "Low Friction Ball Separator for Propeller Blade Ball Bearings". In such applications, the ball bearing assembly permits blade angle change or pitch change while supporting and transmitting centrifugal and thrust loads created by the blade during operation. These bearing assemblies often experience cyclic bending loads and twisting moments. Cyclic bending loads and twisting moments can be imparted to the bearing assembly as a result of the machine operating in a non-uniform or asymmetric flow field, such as fluid flow to the propeller that is not in-line and parallel with the propeller's axis of rotation. These cyclic loads and moments tend to cause migration of the balls to a common point, which produces a bunching effect. Additionally, the ball bearings of the assembly typically do not rotate about a given blade's pitch axis a full 360°, but rather tend to rotate only a few degrees during normal operation, which can exacerbate bunching effects. Example ranges for degrees of rotation of the ball bearings along a raceway of the bearing assembly are −12° to +85°, and 0° to 50°, with other ranges possible in further embodiments.

Figure 2:
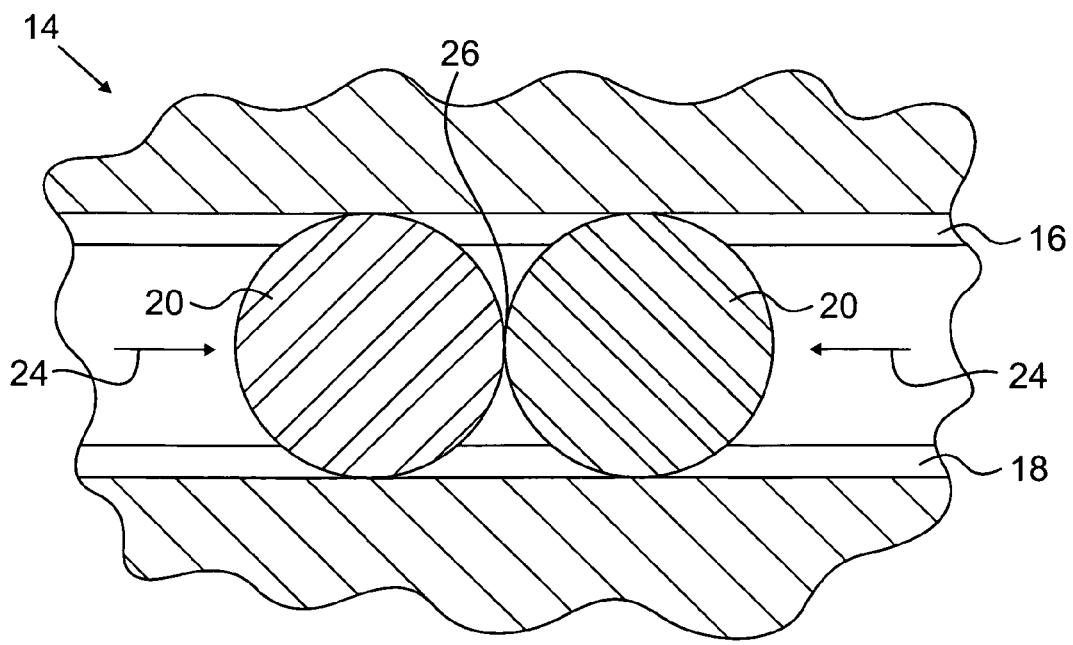
FIG. 2 is a cross-sectional view of a portion of the bearing assembly of FIG. 1, illustrating ball-to-ball contact under cyclic loading.

FIGS. 1 and 2 illustrate a prior art bearing assembly 14. FIG. 1 is a schematic plan view of the prior art bearing assembly 14, and FIG. 2 is a cross-sectional view of a portion of the prior art bearing assembly 14. The bearing assembly 14 includes an first race 16 (not shown in FIG. 1), a second race 18 (not shown in FIG. 1), and a plurality of ball bearings 20 arranged in a circular pattern that corresponds to a raceway defined by the first and second races 14 and 16. Only two balls are shown in FIG. 2 for simplicity. Bending loads (also called "1P" loads) that occur cyclically during use are represented in FIG. 1 by arrows 22. Migration of the balls 20 resulting from the bending loads (arrows 22) occurs in the directions indicated by arrows 24. Migration of the balls 20 will generally follow the raceway defined by the first and second races 16 and 18. A bending load will tend to cause the balls 20 to bunch together at a particular point along the raceway, and as bending loads vary the point where bunching occurs along the raceway will vary accordingly. As shown in FIG. 2, contact between two adjacent balls 20 occurs at a point 26 due to generally circumferential migration in the directions of the arrows 24.

Figure 3:
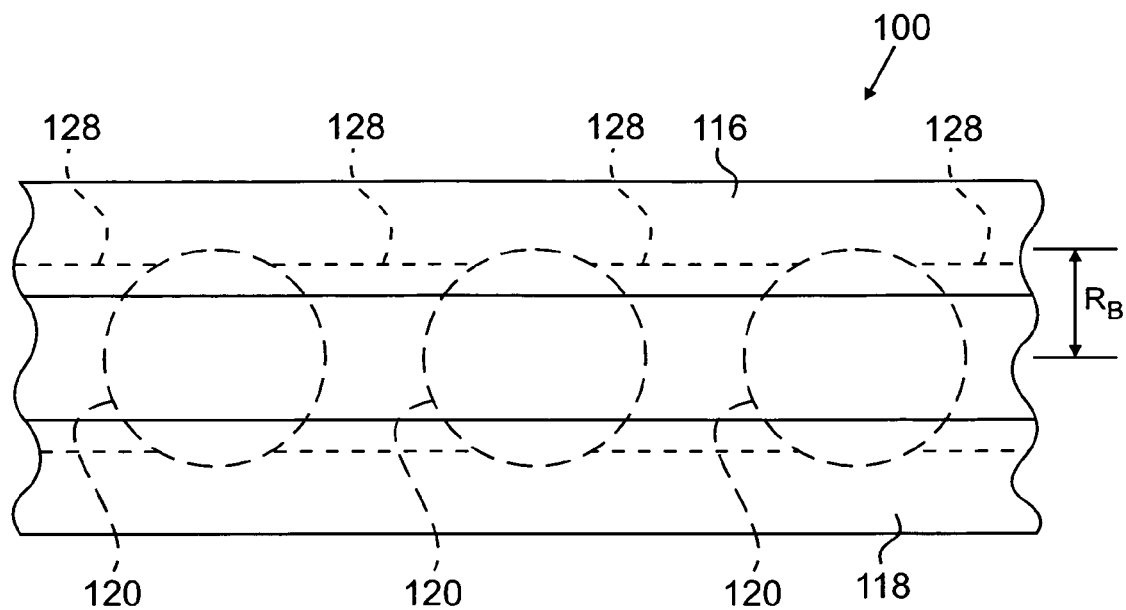
FIG. 3 is a front elevation view of a portion of a bearing assembly according to the present invention.
Figure 4:
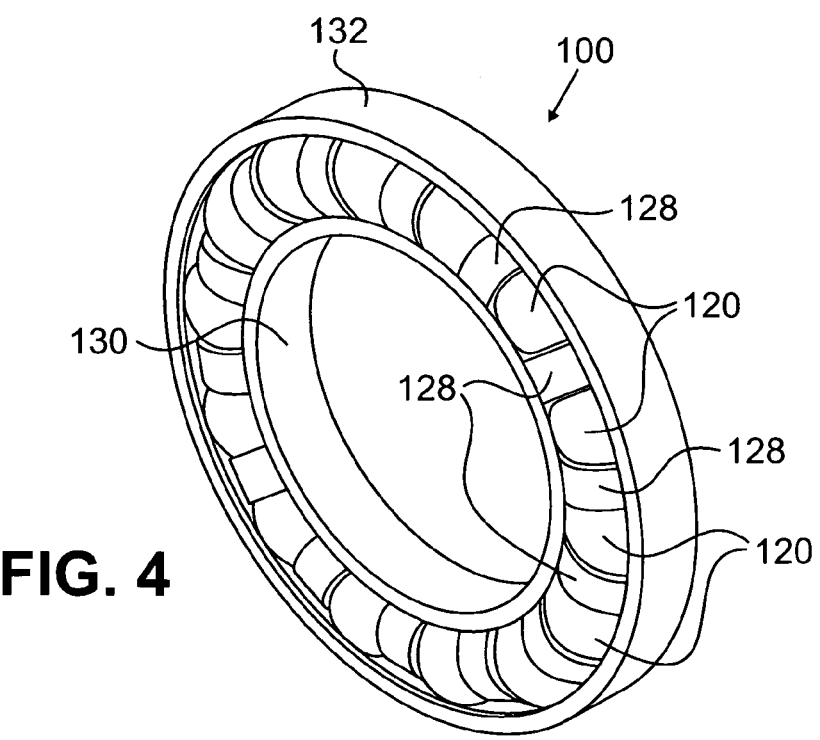
FIG. 4 is a perspective view of a portion of the bearing assembly of FIG. 3, illustrated with bearing races omitted.
Figure 5:
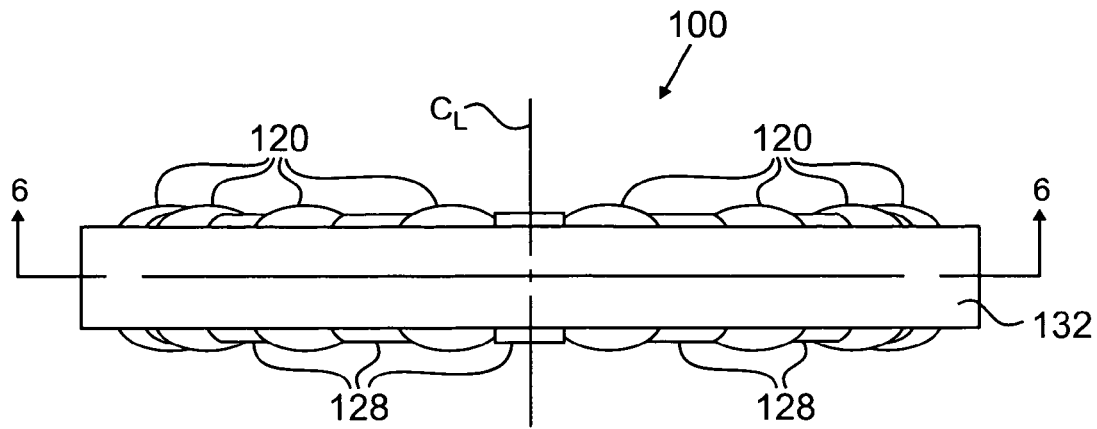
FIG. 5 is a front elevation view of the portion of the bearing assembly of FIG. 4.
Figure 6:
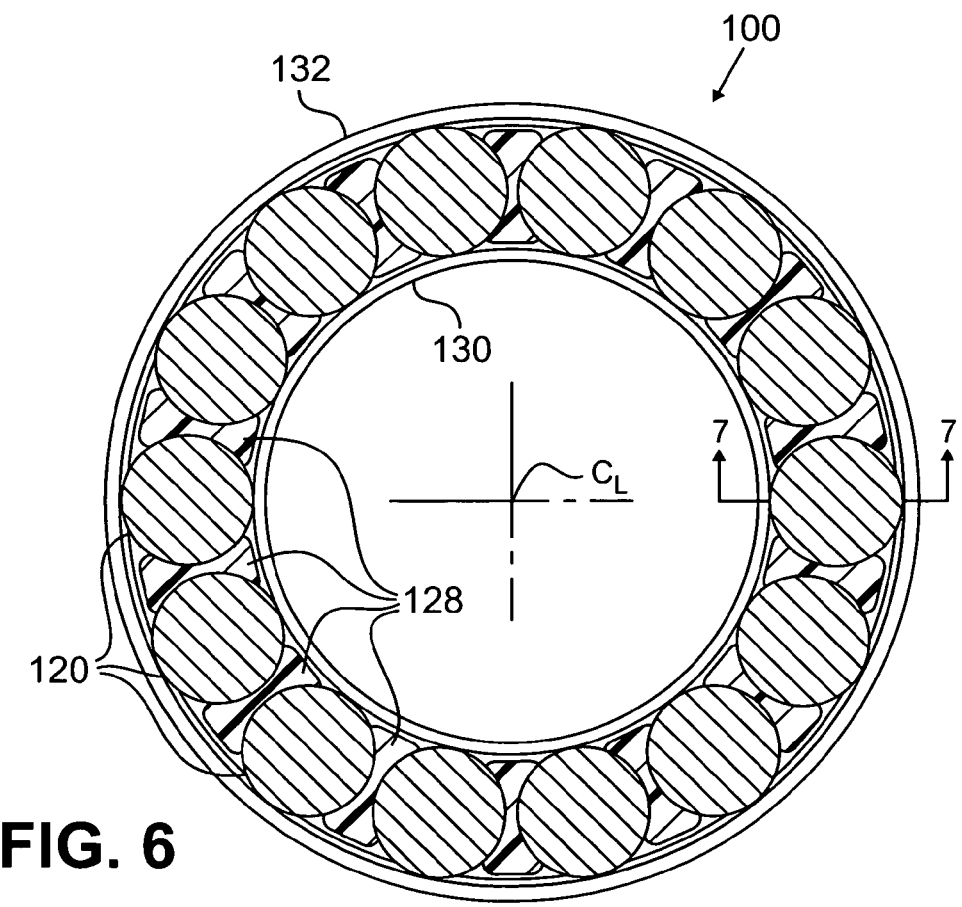
FIG. 6 is a cross-sectional view of a portion of the bearing assembly, taken along line 6-6 of FIG. 5.
Figure 7:
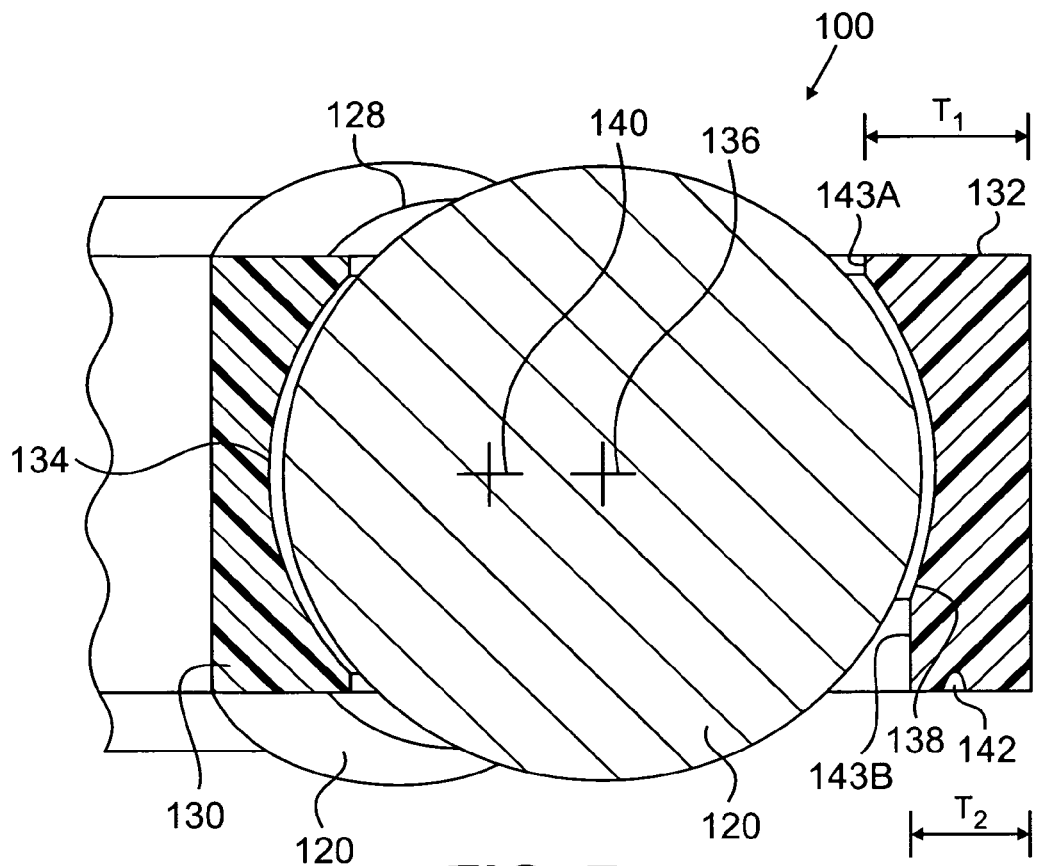
FIG. 7 is a cross-sectional view of a portion of the bearing assembly, taken along line 7-7 of FIG. 6.

A bearing assembly 100 according to one embodiment of the present invention is shown in FIGS. 3-7. FIG. 3 is a front elevation view of a portion of the bearing assembly 100, FIG. 4 is a perspective view of a portion of the bearing assembly 30, FIG. 5 is a front elevation view of a portion of the bearing assembly 100, FIG. 6 is a cross-sectional view of a portion of the bearing assembly 100 taken along line 6-6 of FIG. 5, and FIG. 7 is a cross-sectional view of a portion of the bearing assembly 100 taken along line 7-7 of FIG. 6.

As shown in FIGS. 3-7, the bearing assembly 100 includes a first race 116, a second race 118, a plurality of balls 120 (i.e., ball bearings) positioned to operate in a generally circular raceway defined between the first and second races 116 and 118, a plurality of spacers 128, an inner ring 130 and an outer ring 132. The bearing assembly 100 is arranged relative to a centerline $C_L$. It should be noted that the inner and outer rings 130 and 132 are not visible in FIG. 3, and the first and second races 116 and 118 are not shown in FIGS. 4-7.

The balls 120 can each have a known spherical configuration, and all have substantially the same radius $R_B$. The first and second races 116 and 118 can have a known configuration, which can vary as desired for particular applications. A rotational movement between the first and second races 116 and 118 can be achieved during operation through corresponding movement of the balls 120. In an installation, the first and second races 116 and 118 can each be attached to a desired component (e.g., the first race 116 to a variable pitch blade and the second race 118 to a blade support hub), or can be integrally formed with such components. Centrifugal and thrust loads exerted on the bearing assembly 100 are supported by and transmitted through the balls 120 and the first and second races 116 and 118.

One of the spacers 128 is positioned between each pair of adjacent balls 120 to prevent ball-to-ball contact. The spacers 128 are made of a low-friction polymer material, such as a material made up of approximately 85% by weight polytetrafluoroethylene (PTFE) and 15% by weight graphite, plus incidental impurities. Other known low-friction material can be utilized as desired. The balls 120 are able to rotate with minimal frictional interference from the spacers 128. The spacers 128 need not support any loads between the first and second races 116 and 118. It should be noted that not all details of the spacers 128 are visible in FIG. 6 (see FIGS. 8 and 9, discussed below).

The inner ring 130 is annular-shaped and can be made of the same material as the spacers 128. As shown in FIG. 7, a toroidal groove 134 is formed on an outer diameter surface of the inner ring 130 and arranged to face the balls 120. The toroidal groove 134 can have an arcuate shape defined about a center point 136. When the bearing assembly 100 is fully assembled for operation, the inner ring 130 is separated from the balls 120 by a small gap.

The outer ring 132 is annular-shaped and can be made of the same material as the inner ring 130. As shown in FIG. 7, a toroidal groove 138 is formed on an inner diameter surface of the outer ring 132 and arranged to face the balls 120. The toroidal groove 138 can have an arcuate shape defined about a center point 140. When the bearing assembly 100 is fully assembled for operation, the outer ring 132 is separated from the balls 120 by a small gap. The outer ring 132 can further include an optional indicator 142 (e.g., a notch, groove or other visual indication) to facilitate orienting the outer ring 132 and nearby components during assembly of the bearing assembly 100, and during installation of the bearing assembly 100 to a desired location. In alternative embodiments, the location of the indicator 142 can vary, such as being positioned on the inner ring 130 instead.

The outer ring 132 defines a substantially circular first opening 143A adjacent to the groove 138 and a substantially circular second opening 143B adjacent to the groove 138 at an opposite face of the outer ring 132. The outer ring 132 has a first thickness $T_1$ at the first opening 143A and a second thickness $T_2$ at the second opening 143B. In the illustrated embodiment, the second thickness $T_2$ is smaller than the first thickness $T_1$, which allows the second opening to form a clearance gap to facilitate assembly. During assembly, the plurality of balls 120 and the spacers 128 can be positioned about the inner ring 130, and then the outer ring 132 can be positioned about the balls 120 and spacers 128 to retain them between the inner and outer rings 130 and 132 prior to assembly between the first and second races 116 and 118. The second opening 143B of the outer ring 132 can be sprung or snapped about the balls 120 along a generally axial direction (relative to the centerline $C_L$). The indicator 142 facilitates identification of the location of the second opening 143B during assembly. Once the inner and outer rings 130 and 132 and the balls 120 are assembled together, the resultant subassembly can be handled easily, without a significant risk of loss of constituent parts.

Once assembled, the inner and outer rings 130 and 132 are arranged generally concentrically about the centerline $C_L$. The inner and outer rings 130 and 132 facilitate assembly and handling of bearing assembly 100, but generally do not serve any function once the bearing assembly is installed and is in use. In particular, the inner and outer rings 130 and 132 can retain the balls 120 and the spacers 128 within the grooves 134 and 138 in a desired configuration prior to assembly with the first and second races 116 and 118. As already noted, when fully assembled with the first and second races 116 and 118 for operation, the inner and outer rings 130 and 132 are normally separated from the balls 120 by small gaps, which helps prevent friction. Shapes of the inner and outer rings 130 and 132 and their respective grooves 134 and 140 can vary in alternative embodiments.

Figure 8:
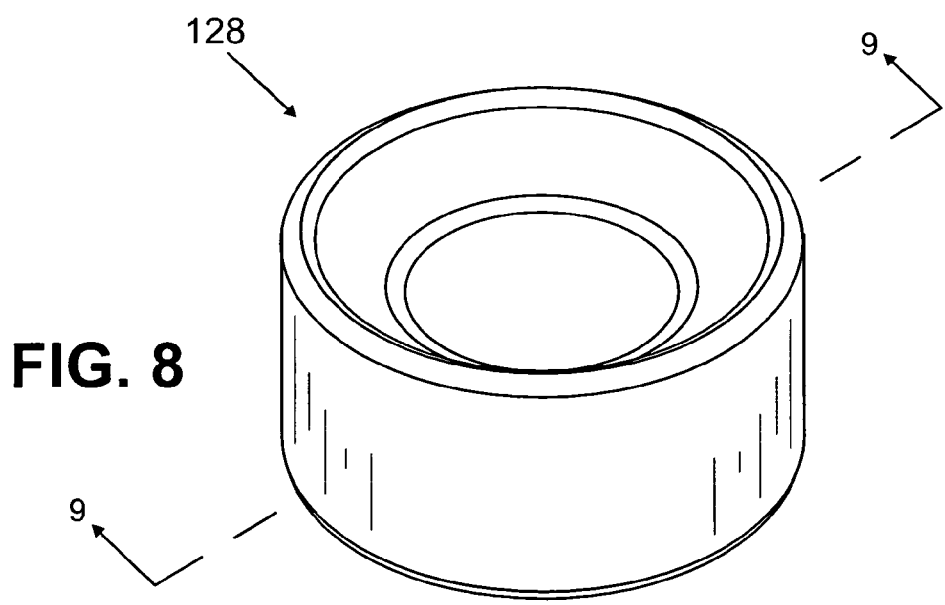
FIG. 8 is a perspective view of a spacer of the bearing assembly.
Figure 9:
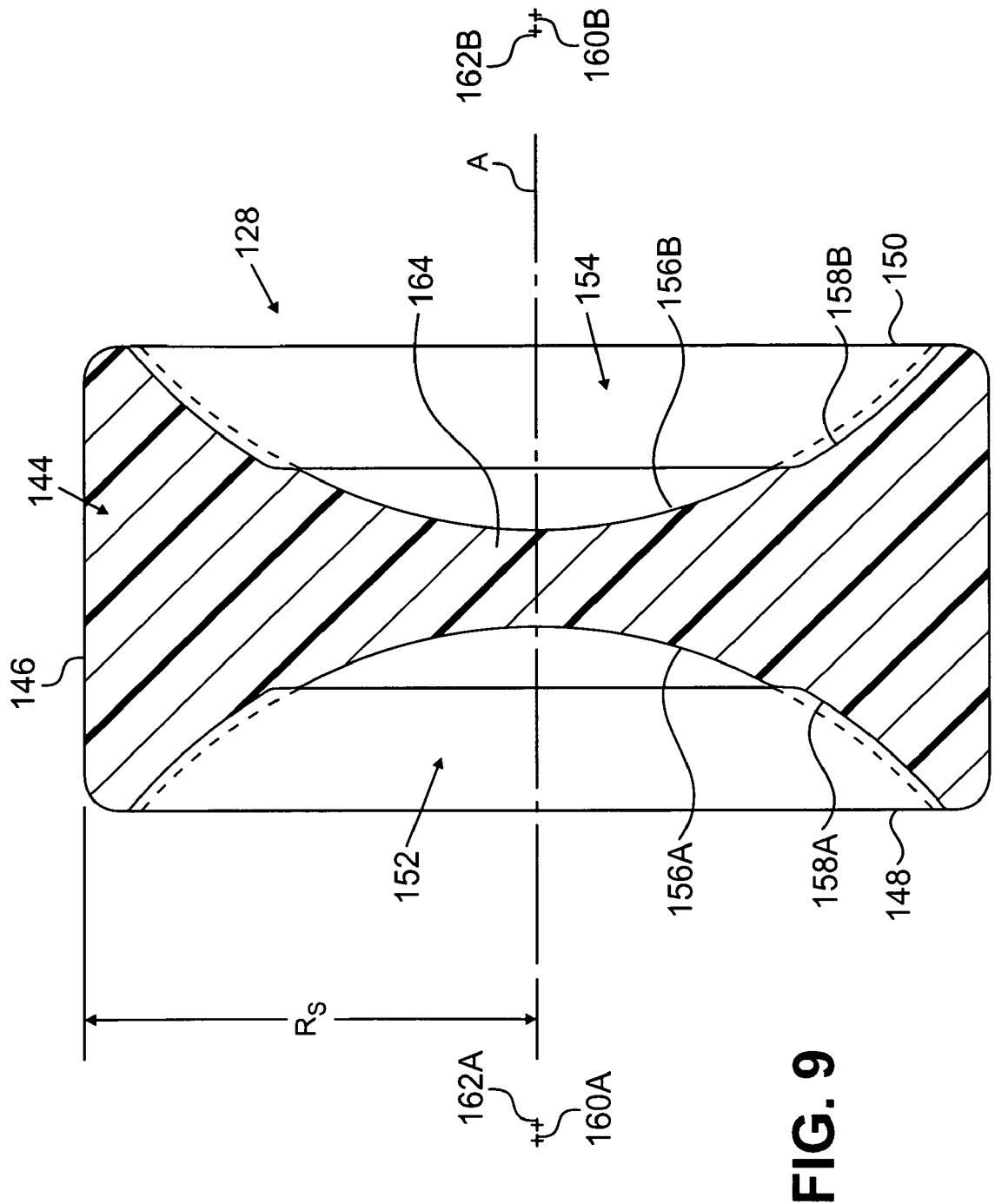
FIG. 9 is a cross-sectional view of the spacer, taken along line 9-9 of FIG. 8.

FIG. 8 is a perspective view of one of the spacers 128 of the bearing assembly 100, and FIG. 9 is a cross-sectional view of the spacer 128 taken along line 9-9 of FIG. 8. The spacer 128 includes a body 144 defined by an outer surface 146, a first side 148 and a second side 150. The first and second sides 148 and 150 are arranged opposite one another. In the illustrated embodiment the outer surface 146 is substantially cylindrical in shape, with the first and second sides 148 and 150 located at opposite ends of the cylindrical outer surface 146. The spacer 128 can have a radius $R_S$ that is smaller than the radius $R_B$ of the balls 120 (see FIGS. 3 and 5). In alternative embodiments, the outer surface 146 can have a rectangular profile (i.e., a rectangular box shape).

A first pocket 152 is formed on the first side 148 of the spacer 128, and a second pocket 154 is formed on the second side 150 of the spacer 128. The first and second pockets 152 and 154 are substantially concave in shape, and are arranged generally coaxially about a central axis A of the spacer 128. Each pocket 152 and 154 includes a respective central region 156A and 156B and an outer region 158A and 158B arranged radially outward and directly adjacent to the corresponding central region 156A or 156B. In one embodiment, a radius of curvature of the each outer region 158A and 158B can be substantially equal to that of the corresponding central region 156A and 156B at a given side 148 or 150 of the spacer 128, with the respective centerpoints 160A and 160B about which each central region 156A and 156B is defined being axially spaced (i.e., offset along the axis A) from centerpoints 162A and 162B about which each outer region 158A and 158B is defined, respectively. In one embodiment, the axial spacing between the centerpoints 160A and 160B and the corresponding centerpoints 162A and 162B at each side 148 or 150 is approximately 0.25 mm (0.0098 in.). This offset causes the outer regions 158A and 158B to be recessed relative to the corresponding central regions 156A and 156B (dashed lines are shown in FIG. 9 to illustrate the offset of the outer regions 158A and 158B relative to the respective central regions 156A and 156B). This offset reduces a surface area of the spacer 128 that can frictionally contact the balls 120, generally permitting physical contact only at the central regions 156A and 156B. A transition between each central region 156A and 156B and the respective outer region 158A or 158B can incorporate curvature to accommodate the offset while allowing the first and second pockets 152 and 154 to have relatively smooth exposed surfaces.

A middle portion 164 of the body 144 extends substantially continuously from the axis A to the outer surface 146 of the spacer, and passes between both the central regions 156A and 156B of the pockets 152 and 154. The middle portion 164 helps to provide structural strength to the spacer 128, to resist deformation during operation. For example, as noted with respect to FIGS. 1 and 2, ball migration tends to occur in the directions 24, which forces the balls 120 against the pockets 152 and 154 of each spacer 128. Such forces tend to wedge the balls 120 into the pockets 152 and 154, thereby undesirably increasing friction. An opening or lack of material at or near the axis A could increase the likelihood of such wedging. However, according to the present invention, the middle portion 164 of the body 144 helps resist radial deformation of the spacer 128, which helps prevent undesired wedging and friction between the balls 120 and the spacers 128.

It will be appreciated the present invention provides numerous advantages and benefits. For example, the present invention helps reduce undesired effects from bunching of balls in bearing assemblies that has been discovered to occur in certain applications due to cyclic loading. The present invention also provides spacers (or separators) that have a relatively low frictional impact on bearing assembly operation.

Although the present invention has been described with reference to preferred embodiments, workers skilled in the art will recognize that changes may be made in form and detail without departing from the spirit and scope of the invention. For instance, the present invention can be utilized with a variety of applications. Moreover, components of the present invention can be made from a variety of materials as desired for particular applications.

The invention claimed is:

1. A bearing assembly comprising:
   a first annular race defined within a planar surface of a first member;
   a second annular race defined with an opposing planar surface of a second member;
   an inner ring including an annular toroidal groove located on an outer diameter surface of the inner ring;
   an outer ring including an annular toroidal groove located on an inner diameter surface of the inner ring;
   a plurality of ball bearings concentrically disposed between the toroidal grooves of the inner and outer rings and rotatably engaging the first race and the second race; and
   a spacer positioned between each pair of adjacent ball bearings, the spacers each comprising:
   a body defining opposite first and second sides;
   a first substantially concave pocket located at the first side of the body; and
   a second substantially concave pocket located at the second side of the body,
   wherein the first and second substantially concave pockets each define a central region rotatably engaging a respective one of the ball bearings and having a first radius of curvature about a first center point and an outer region adjacent to and recessed relative to the central region that has a second radius of curvature about a second center point, wherein the first center point and the second center point are spaced from one another, and wherein the body includes a portion extending in between at least the respective central regions of the first substantially concave pocket and the second substantially concave pocket;
   wherein the outer ring includes:
   axially opposing first and second surfaces, the inner diameter surface extending between the first and second surfaces, wherein an axial distance between the first and second surfaces is less than a diameter of each of the plurality of ball bearings;
   a first opening defined at the inner diameter surface adjacent to the first surface and to the toroidal groove; and
   a second opening defined at the inner diameter surface adjacent to the second surface and to the toroidal groove,
   wherein the second opening is larger than the first opening to provide a clearance gap adjacent to the toroidal groove to allow bearing entry through the second opening for positioning the outer ring about the plurality of ball bearings.

2. The assembly of claim 1, wherein the body of the spacer defines a substantially cylindrical outer surface.

3. The assembly of claim 1, wherein the spacer comprises a low-friction polymer material.

4. The assembly of claim 1, wherein the spacer is made from a material consisting essentially of about 85% by weight polytetrafluoroethylene and the balance graphite.

5. The assembly of claim 1 and further comprising:
   an indicator on the outer ring to provide an orientation indication for assembly of the bearing assembly.

6. The assembly of claim 1, wherein the outer ring comprises a low-friction polymer material.

7. The assembly of claim 1,
   wherein the inner ring and the outer ring are configured to secure the plurality of ball bearings and each spacer when uninstalled from the first race and the second race, and wherein the ball bearings are each generally spaced from the inner ring and the outer ring when installed with the first race and the second race for operation.

8. A bearing assembly comprising:
   a first annular race defined within a planar surface of a first member;
   a second annular race defined with an opposing planar surface of a second member;
   an inner ring including an annular toroidal groove located on an outer diameter surface of the inner ring;
   an outer ring including an annular toroidal groove located on an inner diameter surface of the inner ring;

a plurality of ball bearings concentrically disposed between the toroidal grooves of the inner and outer rings and rotatably engaging the first race and the second race; and a spacer positioned between each pair of adjacent ball bearings, the spacers each comprising:

a body defining opposite first and second sides;

a first substantially concave pocket located at the first side of the body rotatably engaging a respective one of the ball bearings; and a second substantially concave pocket located at the second side of the body rotatably engaging a respective one of the ball bearings;

wherein the outer ring includes:

axially opposing first and second surfaces, the inner diameter surface extending between the first and second surfaces, wherein an axial distance between the first and second surfaces is less than a diameter of each of the plurality of ball bearings;

a first opening defined at the inner diameter surface adjacent to the first surface and to the toroidal groove;

a second opening defined at the inner diameter surface adjacent to the second surface and to the toroidal groove, wherein the second opening is larger than the first opening to provide a clearance gap adjacent to the toroidal groove to allow bearing entry through the second opening for positioning the outer ring about the plurality of ball bearings; and an indicator located on the second surface of the outer ring to provide an orientation indication relative to the second opening that provides the clearance gap.

9. The assembly of claim 8, wherein the inner ring and the outer ring are configured to secure the plurality of ball bearings and each spacer when uninstalled from the first race and the second race, and wherein the ball bearings are each generally spaced from the inner ring and the outer ring when installed with the first race and the second race for operation.

10. The assembly of claim 8, wherein the body of the spacer defines a substantially cylindrical outer surface.

11. The assembly of claim 8, wherein the spacer comprises a low-friction polymer material.

12. The assembly of claim 11, wherein the spacer is made from a material consisting essentially of about 85% by weight polytetrafluoroethylene and the balance graphite.

13. The assembly of claim 8, wherein the first and second substantially concave pockets each define a central region rotatably engaging the ball bearings and having a first radius of curvature about a first center point and an outer region adjacent to and recessed relative to the central region that has a second radius of curvature about a second center point, wherein the first center point and the second center point are spaced from one another, wherein the first and second radii of curvature are approximately equal, and wherein the body includes a portion extending in between the respective central regions of the first substantially concave pocket and the second substantially concave pocket.

* * * * *